United States Patent [19]

Eckhoff et al.

[11] 3,925,198
[45] Dec. 9, 1975

[54] APPARATUS AND METHOD OF AIR CLASSIFYING MUNICIPAL SOLID WASTES

[75] Inventors: David W. Eckhoff; Blaine L. Fullmer, both of Salt Lake City, Utah

[73] Assignee: University of Utah, Salt Lake City, Utah

[22] Filed: Jan. 29, 1975

[21] Appl. No.: 545,191

[52] U.S. Cl. ........................ 209/3; 209/37; 209/138; 209/141; 241/19; 241/DIG. 38
[51] Int. Cl.² .......................................... B07B 7/04
[58] Field of Search .................... 110/8 R, 8 C, 8 P; 209/34–37, 3, 136–139 R, 140, 141; 241/19, DIG. 38

[56] References Cited
UNITED STATES PATENTS

| | | | |
|---|---|---|---|
| 1,465,884 | 8/1923 | Vandervoort | 209/137 |
| 1,753,573 | 4/1930 | Lorentz | 209/139 R |
| 1,861,248 | 5/1932 | Stebbins | 209/37 X |
| 2,351,351 | 6/1944 | Maxwell et al. | 209/137 |
| 3,624,748 | 11/1971 | Strydom | 209/140 X |
| 3,833,117 | 9/1974 | Mackenzie et al. | 209/138 |

FOREIGN PATENTS OR APPLICATIONS

| | | | |
|---|---|---|---|
| 255,995 | 11/1962 | Australia | 209/138 |
| 1,920,310 | 12/1970 | Germany | 209/138 |
| 468,212 | 6/1937 | United Kingdom | 209/139 R |

*Primary Examiner*—Frank W. Lutter
*Assistant Examiner*—Ralph J. Hill
*Attorney, Agent, or Firm*—Mallinckrodt & Mallinckrodt

[57] ABSTRACT

Collected municipal solid waste materials containing the usual assortment of both combustible and non-combustible trash, garbage, and the like are shredded to manageable size for air classification and are fed continuously into an air-classification column intermediate the height thereof while introducing a classifying stream of air at the bottom of the column. The column is equipped with baffles arraanged to intercept the rising stream of air and entrained solids and establish a vertical series of stages of localized circulation transversely across the column accompanied by impact of the solids against baffle and column wall surfaces. There are overlapping baffles beneath the location of material feed, and, thereabove, a progressive reduction in air stream interception, so that flow velocity through the column will progressively decrease from bottom to top thereof.

10 Claims, 3 Drawing Figures

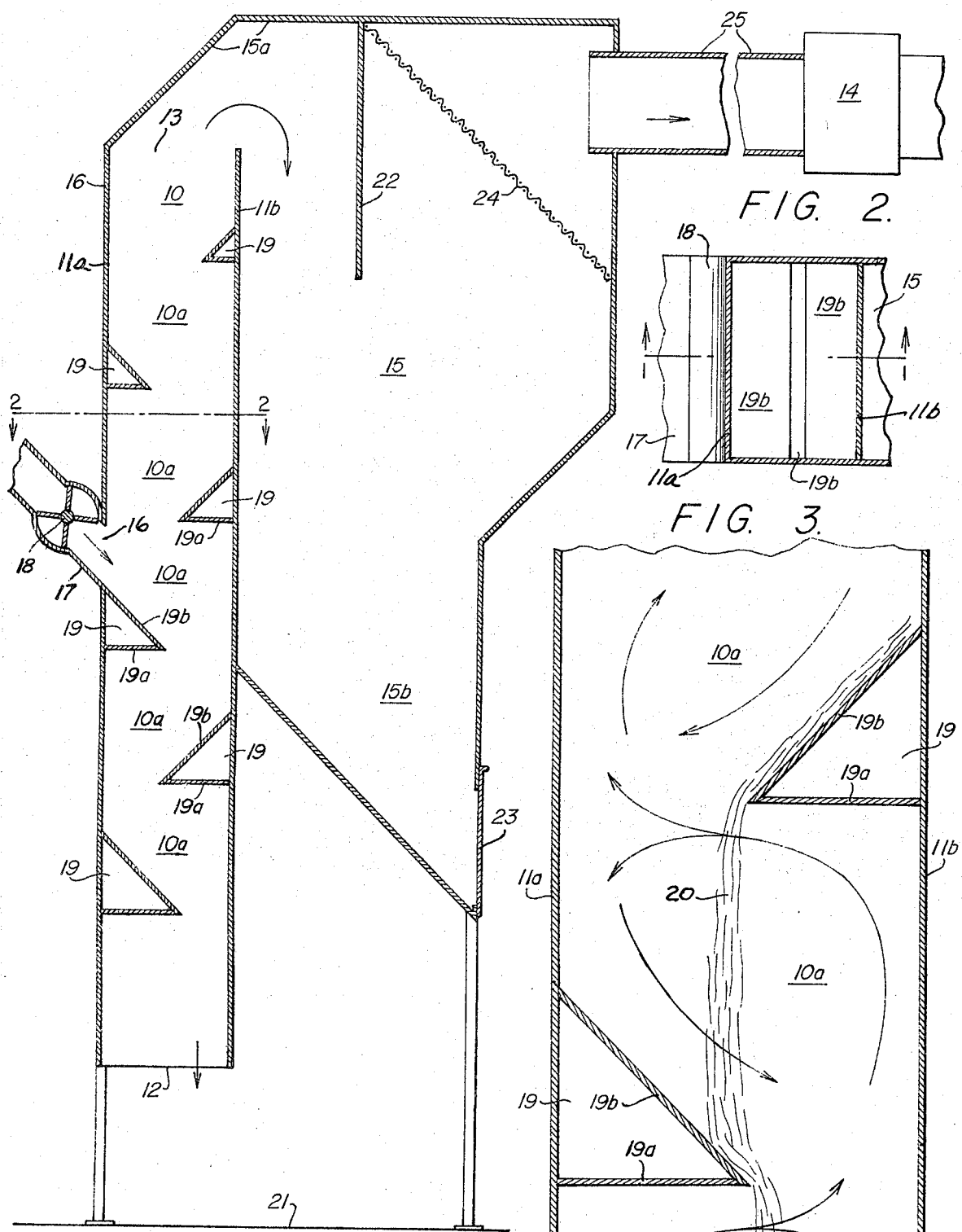

APPARATUS AND METHOD OF AIR CLASSIFYING MUNICIPAL SOLID WASTES

BACKGROUND OF THE INVENTION

1. Field

From a method standpoint, the invention is in the field of processing collected municipal solid waste materials to separate relatively combustible solids from relatively non-combustible solids so that both can be conveniently disposed of or reclaimed. From the standpoint of apparatus, the invention is in the field of air classifiers or elutriation columns.

2. State of the Art

It has been recognized heretofore that separation of collected municipal solid waste materials into relatively combustible and non-combustible fractions is desirable to enable use of the former as fuel and salvage of the latter for recycling in the economy. Various approaches have been taken to the problems of achieving such a separation, but subjecting shredded municipal solid wastes to air classification or elutriation recommends itself from the standpoints of low capital investment and economical operating costs. Past attempts, however, have not produced acceptable results. The use of a horizontal airstream into which the shredded materials are dropped should have, theoretically, achieved a separation of the lighter, relatively combustible components from the heavier, relatively non-combustible components, but in practice too much of the one remains with the other and effective salvage or disposal of either product is not possible. An attempt to utilize a so-called "Zig-zag" vertical air-classification column at Stanford Research Institute appears to have been unsuccessful for the same reason.

Although the art of air-classification apparatus is highly developed for a variety of materials, none of the materials known to have been successfully treated have been as diverse in make-up as collected municipal solid wastes, which commonly include trash and refuse of all kinds, such as waste paper, plastic, glass, metals, wet and dry garbage, etc. Shredding, i.e. size reduction by crushing, grinding, cutting, or the like, merely reduces the size of individual pieces to manageable proportions. The larger the piece or particle size that can be handled in the separation procedure, the less energy required for shredding and the more acceptable the separation method and apparatus for general use.

Objects

It was a primary objective in the making of this invention to provide air-classification method and apparatus for effectively separating relatively combustible components of collected municipal waste solid materials from relatively non-combustible components, and vice versa, so the former can be used as a fuel for burning and the latter can be satisfactorily subjected to salvage procedures for the recovery of metals, glass, plastic, and other potentially valuable materials. Another object was to enable use of larger shredded piece or particle size than heretofore.

SUMMARY OF THE INVENTION

The method of the invention involves shredding collected municipal solid waste materials to manageable size, e.g. pieces ranging up to 4 by 4 inches considered from a two dimensional standpoint, or even larger, depending upon the cross-sectional area of the air-classification column. The shredded waste materials are fed into a substantially vertical air-classification column intermediate its height, and a classifying stream of air is introduced at the bottom of the column and passed upwardly therethrough and out at the top. The air stream is intercepted from mutually opposite sides of the column, alternately, at distance intervals along the height of the column to establish a substantially vertical series of individual stages of localized circulation of air and entrained solids transversely across the column from side-to-side thereof accompanied by impact of solids against interception and column-defining surfaces. Within at least one of the stages of localized circulation located below the feed of waste materials, relatively heavy components that descend by gravity against the force of the air stream are flowed downwardly and simultaneously passed across the column and are dropped onto an impact surface. Thereabove, relatively lighter components carried by the air stream are passed from stage to stage at progressively reduced velocities.

The apparatus includes walls defining the air-classification column and a pair of opposing sets of baffles projecting inwardly of the column from respective, mutually opposite walls, the baffles alternating from wall to wall in substantially vertically spaced arrangement and extending substantially perpendicularly of the walls to provide the individual stages between successive baffles. It is preferable that each baffle have its lower surface substantially flat to provide maximum impact. The upper surface of each baffle is substantially flat and sloped downwardly from the wall so that heavier materials deposited thereon will slide downwardly by gravity. The baffles that form at least one of the stages below the location of material feed, overlap so heavier material cascading from the upper of the overlapped baffles will impact against the lower of the overlapped baffles. The column thereabove increases progressively in flow capacity to decrease the velocity of upward flow therein.

THE DRAWINGS

In the drawings, which illustrate an embodiment of air classifier or elutriation column constituting apparatus presently contemplated as the best mode of carrying out the invention:

FIG. 1 is a vertical section taken along the line 1—1 of FIG. 2 showing the air-flow column and arrangement of flow-intercepting baffles along the height of the column;

FIG. 2, a fragmentary horizontal section taken along the line 2—2 of FIG. 1; and FIG. 3, a fragmentary lower portion of the air-flow column and associated baffles drawn to a larger scale and having appended arrows indicating circulation of air and entrained waste materials transversely across the column, relatively heavy and non-entrained components being indicated by broken lines as dropping by gravity from an upper baffle to impact on a lower baffle in this lower portion of the air-flow column.

DETAILED DESCRIPTION OF THE ILLUSTRATED EMBODIMENT

In the illustrated form of the invention, an air-classification or elutriation column 10 of rectangular cross section is defined by walls 11 which include mutually opposite and confronting walls 11a and 11b. Column 10 is open at its bottom, as at 12, and is also open at its top, as at 13, providing an inlet and an outlet, respectively, for air to enter and leave the column.

Means for flowing a classifying stream of air upwardly through the column is provided by an exhaust fan or blower 14 communicating with the open upper end 13 of column 10 by way of a collection chamber 15 for the relatively light components of solid municipal waste materials that are introduced into the column for classification purposes on the basis of the relatively heavy (mostly non-combustible) and relatively light (mostly combustible) components thereof. Municipal solid wastes that have been collected in the usual manner as wet and dry garbage, trash, and refuse of all kinds, are shredded and fed into column 10 intermediate its height through a feed opening 16 by means of a chute 17 and a rotary star feed device 18 from a suitable hopper (not shown) into which the shredded waste materials are deposited.

A pair of opposing, i.e. confronting, sets of baffles 19 project inwardly of column 10 from the respective opposite walls 11a and 11b, the individual baffles of such sets alternating from wall to wall in substantially vertical arrangement to define a substantially vertical series of individual air-circulation stages 10a between mutually adjacent but opposing baffles 19, respectively. Each of the baffles has a lower surface 19a extending substantially perpendicularly of the walls 11a and 11b for intercepting upward flow of air and entrained waste materials and for directing such flow transversely across the column, somewhat as indicated by the appended arrows in FIG. 3. Thus, there will be localized circulation of air and entrained waste materials transversely across the column from wall to wall thereof and across the intervening space between the stage-defining baffles in each of the stages 10a.

Each of the baffles has its upper surface 19b substantially flat and sloping downwardly into the column, as illustrated, so heavier waste materials deposited thereon will slide downwardly by gravity. It is advantageous that the lower surface 19a of each baffle be substantially flat to provide for most effective impact of solids thereagainst and turbulent localized circulation of air and entrained solids within the individual stages 10a. As illustrated, it is also advantageous to arrange the baffles in such a manner in the column that an upper surface 19b of one provides a downward extension of feed chute 17, thereby projecting the fed waste materials toward the opposite side of the column from feed opening 16.

At least one of the stages 10a of localized circulation (here shown as two) is provided by baffles 19 that overlap across the column so that relatively heavy components of the waste materials that slide down the inclined surface 19b of an upper baffle will drop onto and impact against the inclined surface 19b of the next lower baffle, much as is indicated at 20 in FIG. 3.

In operation, the shredded waste materials are fed down chute 17, air being excluded by rotary star feed device 18 serving as air-lock means. Such fed materials slide into the immediately adjacent, localized circulation stage 10a of the upwardly flowing stream of classifying air induced in column 10 by exhaust fan or blower 14. Relatively heavy components, such as incombustible glass fragments and pieces of metal, and agglomerated clumps of both heavy and light materials drop by gravity (see 20, FIG. 3) onto and impact against the upper inclined surface 19b of the next lower baffle 19. The clumps tend to be broken by impact and attrition, with heavier portions continuing downwardly of the column until they are discharged through the open bottom 12 of the column onto receiving surface 21 or into any suitable collection vessel. If desired, receiving surface 21 can be the upper surface of a belt or other endless conveyor operating below the column.

The relatively light components and agglomerated clumps of the fed waste materials are picked up by the circulating air and are impacted against inner surfaces of column walls 11 and against lower baffle surfaces 19a as they circulate within the individual stages 10a and as they rise from stage to stage in the column to ultimate discharge through the open upper end 13 of the column and are deposited in collection chamber 15.

As the flowing stream from column 10 abruptly changes direction by reason of upper wall 15a and a baffle wall 22 in collection chamber 15, entrained solid waste materials drop into storage hopper section 15b of the collection chamber 15 for ultimate removal through door 23. The exhaust air flowing to exhaust fan or blower 14 through screen 24 and conduit 25 is essentially free of solid waste materials and may be discharged to the atmosphere directly or may be passed through additional equipment, such as a dust collector, for removing any residual solids that may remain suspended therein. Any means that will create the air flow within the column and any type collection system for recovery of the entrained relatively light particles could, of course, be used instead of what is shown. For example, a fan could be placed over the discharge opening 13 immediately at the top of the column, so that the air stream and the relatively light components entrained therein pass through it and appropriately placed ducts to any suitable means for recovery of such relatively light components.

It should be realized that the circular and turbulent nature of the air flow within each stage 10a of localized circulation causes agglomerated clumps of the solid wastes carried by such flow to be thrown outwardly against impact surfaces. Thus, there is a positive tendency to break such lumps and expose both lighter and heavier constituents thereof to air classification.

In order to obtain the most effective separation of the relatively heavy and the relatively light components of the fed materials, the upwardly rising stream of classifying air is progressively reduced in flow velocity by making the baffles 19 of progressively reduced size and extent of projection into column 10 above the overlapping baffles 19 in the lower part of the column. Since, in this embodiment, the column is of substantially uniform cross section between the defining walls thereof, the progressive reduction of baffle size progressively increases the flow area between each baffle and the opposing wall of the column.

The column is shown as of rectangular cross section, with the baffles projecting from opposite wider walls thereof, but this may be varied.

It should be noted that the initial separation of relatively heavy components from relatively light components effected by gravity and the repeated impacts of solid waste materials by being both dropped downwardly against the air stream and passed upwardly with the air stream break up agglomerations of waste material and release individual constituents to the separating action of the column. The substantially flat, perpendicular lower surfaces of the baffles are particularly effective in the impact function and in directing circulation within each of the stages 10a.

In operation of an experimental column utilizing a flow velocity of 12 cubic feet per second per square foot of overall cross-sectional column area (cross-sectional area of column without baffles) and stagewise separation as shown in the drawing for typical municipal solid waste materials shredded to approximately minus 4 inches and containing about seventeen percent non-combustibles and about eighty-three percent combustibles, about 9 percent of the non-combustibles appeared in the relatively light fraction along with about seventy-nine percent of the combustibles. This gives the recovered relatively light fraction a breakdown of approximately 2% non-combustibles and 98% combustibles. The recovered light fraction represents about 67% of the original shredded waste materials fed to the column.

The following table is indicative of fuel characteristics and recovery that is obtainable by use of the invention from typical collected municipal solid wastes:

TABLE I

| Component | PERCENT BY WEIGHT | |
| --- | --- | --- |
| | Wastes as received | Resultant Fuel |
| Non-Combustible | | |
| Rocks & Dirt | 0 | 0 |
| Ferrous Metals | 7.8 | 0.08 |
| Nonferrous Metals | 1.0 | 0.05 |
| Glass and other | 7.8 | 1.82 |
| | 16.9 | 1.95 |
| Combustible | | |
| Paper | 52.2 | 78.8 |
| Wet Garbage | 11.8 | 0.1 |
| Yard & Garden | 6.7 | 8.6 |
| Other | 12.2 | 10.6 |
| | 82.9 | 98.1 |

Whereas this invention is here illustrated and described with particular reference to the best mode presently contemplated of carrying it out, it should be realized that various changes may be made without departing from the inventive concepts as here generically disclosed and claimed.

We claim:

1. Apparatus for classifying, into combustible and non-combustible fractions, collected municipal solid waste materials that have been shredded, comprising wall means defining a substantially vertical airflow column; means for flowing a classifying stream of air upwardly through the column; air lock means for feeding shredded municipal solid waste materials into the column intermediate the height thereof; opposing sets of baffles projecting inwardly of the column from respective, mutually opposite walls of said wall means, the baffles thereof alternating from wall to wall in substantially vertically spaced arrangement to define a series of individual stages along the height of the column, each stage extending from wall to wall of said mutually opposite walls and between mutually adjacent but opposing baffles, each of the baffles having its lower surface extending substantially perpendicularly of said walls for abruptly intercepting the upward flow of air and entrained waste materials and directing such flow transversely across the column, so there will be localized circulation of air and entrained waste materials across the column within the individual aircirculation stages for effecting repeated impacts of entrained waste materials against baffle and wall surfaces of said stages, each of the baffles having its upper surface substantially flat and sloping downwardly into the column, so heavier waste materials deposited thereon will slide downwardly by gravity, there being at least one of said stages located below the air lock feeding means and formed by baffles that overlap across the column, said column increasing progressively in flow area between each baffle and the opposing wall of the column above said baffles that overlap for progressively decreasing upward flow velocity; means at or near the upper end of the column for the discharge of lighter components of the shredded solid waste materials as a relatively combustible fraction; and means at or near the lower end of the column for the discharge of heavier components of the shredded solid waste materials as a relatively non-combustible fraction.

2. Apparatus in accordance with claim 1, wherein the baffles have their lower surfaces, respectively, substantially flat as impact and flow-directing surfaces.

3. Apparatus in accordance with claim 1, wherein the column is rectangular in cross section.

4. Apparatus in accordance with claim 3, where the column has two sets of opposing walls, the walls of one set being wider than those of the other; and wherein the baffles project from two wider opposing walls.

5. Apparatus in accordance with claim 1, wherein the column is of substantially uniform cross section from wall to wall, and the progressively increased flow area between each baffle and the opposing wall of the column above the overlapping baffles is provided by a progressive reduction in the size of the baffles above said overlapping baffles.

6. Apparatus in accordance with claim 5, wherein all the baffles in the column are progressively smaller from the bottom of the column upwardly thereof.

7. Apparatus in accordance with claim 6, wherein the means for flowing a classifying stream of air upwardly through the column is an exhaust fan or blower.

8. Apparatus in accordance with claim 1, wherein the means for the discharge of lighter components includes a collection vessel through which the air stream from the top of the column is passed.

9. A method of separating relatively combustible and non-combustible components of collected municipal solid waste materials, comprising shredding collected municipal solid waste materials; feeding the shredded waste materials into a substantially vertical air-classification column intermediate the height thereof; flowing a classifying stream of air upwardly through the column; abruptly intercepting the air stream from opposite sides of the column alternately at distance intervals along the height of the column to establish a substantially vertical series of stages of localized circulation of air and entrained waste materials across the column transversely thereof, which forces heavier entrained materials outwardly against impact surfaces; cascading relatively heavy components of said waste material from side to side of the column by gravity in at least one of said stages below the feeding of the shredded waste materials; progressively reducing flow velocity in the column above the cascading stage or stages; discharging said relatively heavy components at the bottom of the column as a relatively non-combustible fraction of said collected municipal solid waste materials; and discharging the air stream with entrained relatively light components of said waste materials from the top of the column as a relatively combustible fraction of said collected municipal solid wastes.

10. A method in accordance with claim 9, wherein the waste materials are shredded to about minus 4 inches in size; and the classifying stream of air is flowed upwardly in the column at a flow velocity of about 12 cubic feet per second per square foot of overall cross sectional column area.

* * * * *